(12) United States Patent
Wang et al.

(10) Patent No.: US 10,885,190 B2
(45) Date of Patent: Jan. 5, 2021

(54) IDENTIFYING WEB PAGES IN MALWARE DISTRIBUTION NETWORKS

(71) Applicant: Microsoft Technology Licensing, LLC, Redmond, WA (US)

(72) Inventors: Gang Wang, Santa Barbara, CA (US); Jack W. Stokes, North Bend, WA (US); Cormac Herley, Bellevue, WA (US); David Felstead, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 15/976,836

(22) Filed: May 10, 2018

(65) Prior Publication Data

US 2018/0260565 A1    Sep. 13, 2018

Related U.S. Application Data

(63) Continuation of application No. 13/727,626, filed on Dec. 27, 2012, now Pat. No. 9,977,900.

(51) Int. Cl.
*H04L 29/06* (2006.01)
*G06F 21/56* (2013.01)
*H04L 29/08* (2006.01)
*G06F 21/51* (2013.01)

(52) U.S. Cl.
CPC ............ *G06F 21/566* (2013.01); *G06F 21/51* (2013.01); *G06F 21/562* (2013.01); *H04L 63/14* (2013.01); *H04L 63/1483* (2013.01); *H04L 67/02* (2013.01); *G06F 2221/2101* (2013.01); *G06F 2221/2119* (2013.01)

(58) Field of Classification Search
CPC ............ G06F 21/51; G06F 2221/2119; G06F 21/562; G06F 21/566; G06F 2221/2101; H04L 63/14; H04L 63/1483; H04L 67/02
See application file for complete search history.

(56) References Cited

U.S. PATENT DOCUMENTS

| 8,019,700 B2 | 9/2011 | Provos et al. |
| 2006/0136374 A1* | 6/2006 | Shelest ................. G06F 21/564 |
| 2007/0208822 A1* | 9/2007 | Wang .................. H04L 63/1416 709/217 |

(Continued)

OTHER PUBLICATIONS

Provos, et al., "All your iFRAMEs Points to Us", Retrieved at <<http://static.usenix.org/events/sec08/tech/full_papers/provos/provos.pdf>>, In Proceedings of 17th Conference USENIX Security Symposium, Jul. 28, 2008, pp. 1-15.

(Continued)

*Primary Examiner* — Tri M Tran
(74) *Attorney, Agent, or Firm* — Medley, Behrens & Lewis, LLC

(57) ABSTRACT

Technologies pertaining to analyzing content extracted from web pages by a static crawler to determine whether respective web pages are members of a malware distribution network (MDN) are described. A set of features is learned based upon output of a dynamic crawler over known landing pages of a particular MDN, wherein the set of features are indicative of membership in the MDN. Using such set of features, additional members of the MDN (not subjected to crawling by a dynamic crawler) are identified.

19 Claims, 8 Drawing Sheets

(56) References Cited

U.S. PATENT DOCUMENTS

| | | |
|---|---|---|
| 2010/0192222 A1 | 7/2010 | Stokes et al. |
| 2010/0262693 A1 | 10/2010 | Stokes et al. |
| 2012/0060221 A1 | 3/2012 | Gerber et al. |
| 2012/0159620 A1 | 6/2012 | Seifert et al. |
| 2014/0189864 A1 | 7/2014 | Wang et al. |

OTHER PUBLICATIONS

Dhamija, et al., "Why Phishing Works", Retrieved at <<http://www.cs.berkeley/edu/~tygar/papers/Phishing/why_phishing_works.pdf>>, In Conference on Human Factors in Computing Systems, Apr. 2006, pp. 1-10.

Schechter, et al., "The Emperor's New Security Indicators: An Evaluation of Website Authentication and the Effect of Role Playing on Usability Studies", Retrieved at <<http://commerce.net/wp-content/uploads/2012/04/The%20Emperors_New_Security_Indicators.pdf>>, In IEEE Symposium on Security and Privacy, May 20, 2007, pp. 1-15.

Invernizzi, et al., "EvilSeed: A Guided Approach to Finding Malicious Web Pages", Retrieved at <<http://seclab.cs.ucsb.edu/media/uploads/papers/evilseed.pdf>>, In IEEE Symposium on Security and Privacy, May 2012, pp. 1-15.

Wang, et al., "Cloak and Dagger: Dynamics of Web Search Cloaking", Retrieved at <<http://cseweb.ucsd.edu/~voelker/pubs/cloaking-ccs11.pdf>>, In Proceedings of the 18th ACM Conference on Computer and Communications Security, Oct. 17, 2011, pp. 1-13.

Roesch, Martin., "Snort—Lightweight Intrusion Detection for Networks", Retrieved at <<http://static.usenix.org/event/lisa99/full_papers/roesch/roesch.pdf>>, In Proceedings of the 13th USENIX Conference on System Administration, Nov. 7, 1999, pp. 1-11.

Zhang, et al., "Arrow: Generating Signatures to Detect Drive-By Downloads", Retrieved at <<http://research.microsoft.com/pubs/150143/zhangarrow.pdf>>, In Proceedings of the 20th International Conference on World Wide Web, Mar. 28, 2011, pp. 1-10.

Ball, et al., "ISODATA, A Novel Method of Data Analysis and Pattern Classification", Retrieved at <<http://www.dtic.mil/dtic/tr/fulltext/u2/699616.pdf>>, In Technical Report, DTIC Document, Apr. 1965, pp. 1-79.

Manning, et al., "An Introduction to Information Retrieval", Retrieved at <<http://nlp.stanford.edu/IR-book/pdf/irbookonlinereading.pdf>>, In Cambridge University Press, Apr. 1, 2009, pp. 1-581.

Ratanaworabhan, et al., "Nozzle: A Defense against Heap-Spraying Code Injection Attacks", Retrieved at <<http://static.usenix.org/event/sec09/tech/full_papers/ratanaworabhan.pdf>>, In Proceedings of the 18th Conference on USENIX Security Symposium, Aug. 10, 2009, pp. 1-18.

Livshits, et al., "Zozzle: Low-overhead Mostly Static Javascript Malware Detection", Retrieved at <<http://research.microsoft.com/pubs/141930/tr-1-11-11.pdf>>, In Proceedings of the 20th USENIX Conference on Security Symposium, Aug. 8, 2011, pp. 1-16.

Xie, et al., "Spamming Botnets: Signatures and Characteristics", Retrieved at <<http://www.cs.utexas.edu/~yzhang/teaching/cs386m-f9/Readings/p171-xie.pdf>>, In Proceedings of the ACM SIGCOMM Conference on Data Communication, Aug. 2008, pp. 1-12.

Moshchuk, et al., "A Crawler Based Study of Spyware on the Web", Retrieved at <<http://citeseerx.ist.psu.edu/viewdoc/download;jsessionid=CC9FB137BA27317BFC2096292DF33541?doi=10.1.1.104.2921&rep=rep1&type=pdf>>, In Proceedings of the Network and Distributed System Security Symposium, Feb. 2006, pp. 1-17.

"Know Your Enemy: Malicious Web Servers", Retrieved at >>http://www.honeynet.org/papers/mws/>>, Retrieved Date : Nov. 23, 2012, p. 1.

Wang, et al., "Automated Web Patrol with Strider HoneyMonkeys: Finding Web Sites that Exploit Browser Vulnerabilities", Retrieved at <<http://citeseerx.ist.psu.edu/viewdoc/download?doi=10.1.1.63.812&rep=rep1&type=pdf>>, In Proceedings of the Network and Distributed System Security Symposium, Feb. 2006, pp. 1-15.

Nazario, Jose., "PhoneyC: A Virtual Client Honeypot", Retrieved at <<http://static.usenix.org/event/leet09/tech/full_papers/nazario/nazario.pdf>>, In Proceedings of the 2nd USENIX Conference on Large-Scale Exploits and Emergent Threats, Apr. 1, 2009, pp. 1-8.

Cova, et al., "Detection and Analysis of Drive-by-Download Attacks and Malicious JavaScript Code", Retrieved at <<http://www.cs.ucsb.edu/~vigna/publications/2010_cova_kruegel_vigna_Wepawet.pdf>>, In Proceedings of the 19th International Conference on World Wide Web, Apr. 26, 2010, pp. 1-10.

Kolbitsch, et al., "Rozzle: De-cloaking Internet Malware", Retrieved at <<http://research.microsoft.com/pubs/162710/oakland12.pdf>>, In Proceedings of the Oakland Symposium on Security and Privacy, May 20, 2012, pp. 1-15.

Lu, et al., "BLADE: An Attack-Agnostic Approach for Preventing Drive-by Malware Infections", Retrieved at <<http://www.blade-defender.net/BLADE-ACM-CCS-2010.pdf>>, In Proceedings of the 17th ACM Conference on Computer and Communications Security, Oct. 4, 2010, pp. 1-11.

Stokes, et al., "WebCop: Locating Neighborhoods of Malware on the Web", Retrieved at <<http://research.microsoft.com/pubs/141017/jstokesWebCop.pdf>>, In Proceedings of the 3rd USENIX Conference on Large-Scale Exploits and Emergent Threats, Apr. 27, 2010, pp. 1-8.

Lu, et al., "SURF: Detecting and Measuring Search Poisoning", Retrieved at <<http://www.poly.edu/sites/polyproto.poly.edu/files/csaw2011_submission_21.pdf>>, In Proceedings of the 18th ACM Conference on Computer and Communications Security, Oct. 17, 2011, pp. 1-10.

John, et al., "deSEO: Combating Search-Result Poisoning", Retrieved at <<http://static.usenix.org/event/sec11/tech/full_papers/John.pdf>>, In Proceedings of the 20th USENIX Conference on Security, Aug. 8, 2011, pp. 1-15.

Canali, et al., "Prophiler: A Fast Filter for the Large-scale Detection of Malicious Web Pages", Retrieved at <<http://www.cs.ucsb.edu/research/tech_reports/reports/2010-22.pdf>>, In Proceedings of the 20th International Conference on World Wide Web, Mar. 28, 2011, pp. 1-10.

Seifert, et al., "Capture—Honeypot Client (Capture-HPC)", Retrieved at <<https://projects.honeynet.org/capture-hpc>>Retrieved Date : Nov. 26, 2012, pp. 1-2.

Seifert, et al., "Identification of Malicious Web Pages with Static Heuristics", Retrieved at <<http://ieeexplore.ieee.org/stamp/stamp.jsp?tp=&arnumber=4783302>>, In in Proceedings of the Austalasian Telecommunication Networks and Applications Conference, Dec. 7, 2008, pp. 1-6.

Feinstein, et al., "Caffeine Monkey: Automated Collection, Detection and Analysis of Malicious JavaScript", Retrieved at <<http://people.mozilla.com/~chofmann/security/bh-usa-07-feinstien_and_peck-WP.pdf>>, In Proceedings of the Black Hat Security Conference, Aug. 1, 2007, pp. 1-14.

Likarish, et al., "Obfuscated Malicious Javascript Detection using Classification Techniques", Retrieved at <<http://ieeexplore.ieee.org/stamp/stamp.jsp?tp=&arnumber=5403020>>, In Proceedings of the Conference on Malicious and Unwanted Software, Oct. 13, 2009, pp. 1-8.

Behfarshad, Zahra., "Survey of Malware Distribution Networks", Retrieved at <<http://blogs.ubc.ca/computersecurity/files/2012/04/MDN_survey.pdf>>, Retrieval Date: Nov. 26, 2012, pp. 1-13.

Provos, Niels., "Constructing the Malware Distribution Networks", Retrieved at <<http://static.usenix.org/event/sec08/tech/full_papers/provos/provos_html/node6.html>>, May 13, 2008, p. 1.

Office Action dated Oct. 6, 2014, U.S. Appl. No. 13/727,626, dated Oct. 6, 2014, pp. 1-14.

Reply to Office Action dated Oct. 6, 2014, U.S. Appl. No. 13/727,626, filed Apr. 5, 2015, pp. 1-11.

Final Office Action dated Jun. 4, 2015, U.S. Appl. No. 13/727,626, filed Jun. 4, 2015, pp. 1-23.

Reply Submitted With a Request for Continued Examination, U.S. Appl. No. 13/727,626, dated Dec. 3, 2015, pp. 1-12.

Office Action dated Feb. 23, 2016, U.S. Appl. No. 13/727,626, dated Feb. 23, 2016, pp. 1-25.

Reply to Office Action dated Feb. 23, 2016, U.S. Appl. No. 13/727,626, filed Jul. 25, 2016, pp. 1-14.

(56) References Cited

OTHER PUBLICATIONS

Final Office Action dated Oct. 19, 2016, U.S. Appl. No. 13/727,626, filed Oct. 19, 2016, pp. 1-27.
Reply Submitted With a Request for Continued Examination, U.S. Appl. No. 13/727,626, dated Apr. 19, 2017, pp. 1-13.
Office Action dated Jun. 13, 2017, U.S. Appl. No. 13/727,626, filed Jun. 13, 2017, pp. 1-30.
Reply to Office Action dated Jun. 13, 2017, U.S. Appl. No. 13/727,626, filed Dec. 13, 2017, pp. 1-15.

* cited by examiner

| DYNAMIC CRAWLER OUTPUT | |
|---|---|
| LANDING PAGE | www.foo.com/index.html |
| REDIRECTION URLS | www.a.com/redirect.js<br>Www.b.com/check.php<br>www.c.com/hack.js |
| EXPLOIT URL | www.evil.com/malware.exe |
| IPS | www.foo.com (23.21.215.24)<br>www.a.com (192.168.0.1)<br>www.b.com (192.168.0.2)<br>www.c.com (192.168.0.3)<br>www.evil.com (192.220.74.179) |
| FILE HASH | E21AD55HCCSAD7DC21B...74R |
| DRIVE-BY SUCCESSFUL? | TRUE |

| Feature ID | Feature String |
|---|---|
| 642 | <script language="javascript" type="text/javascript" src="http://js.users.51.la/2406109.js"> </script> |
| 642 | <script language="javascript" type="text/javascript" src="http://js.users.51.la/4456469.js"> </script> |
| 642 | <script language="javascript" type="text/javascript" src="http://js.users.51.la/627317.js"> </script> |
| 442 | <iframe src=http://zlocorp.com/1010/in.cgi?14 width="100%" height="1" scrolling="no" frameborder="0" … |
| 442 | <iframe src=http://zlocorp.com/1010/in.cgi?14 width="100%" height="2" scrolling="no" frameborder="0" … |
| 442 | <iframe src=http://zlocorp.com/1010/in.cgi?14 width="100%" height="7" scrolling="no" frameborder="0" … |
| 2203 | <script type="text/javascript">/* <![CDATA[ */bmone2n.makeAd('14216.1.1.1');/* ]]> <*/</script> |
| 2203 | <script type="text/javascript">/* <![CDATA[ */bmone2n.makeAd('14216.1.1.12');/* ]]> <*/</script> |
| 2203 | <script type="text/javascript">/* <![CDATA[ */bmone2n.makeAd('14216.1.1.2');/* ]]> <*/</script> |
| 2203 | <script type="text/javascript">/* <![CDATA[ */bmone2n.makeAd('14216.1.1.7');/* ]]> <*/</script> |

500

US 10,885,190 B2

IDENTIFYING WEB PAGES IN MALWARE DISTRIBUTION NETWORKS

RELATED APPLICATION

This application is a continuation of U.S. patent application Ser. No. 13/727,626, filed on Dec. 27, 2012, and entitled "IDENTIFYING WEB PAGES IN MALWARE DISTRIBUTION NETWORKS", the entirety of which is incorporated herein by reference.

BACKGROUND

The reach and scale of the Internet has fostered a parasitic industry of those who seek to illegally and/or unethically profit. A common strategy to profit illegally is to infect computers of users with malicious code (malware) that can be employed to obtain passwords, transmit spam, retrieve contact lists, participate in a botnet, etc. An author of malware, to successfully infect a machine (and thus to successfully profit) needs the following: malicious code that is intended to execute on a computing device, a manner to cause the malicious code to execute on the computing device, and an introduction to a user upon whose computing device the malicious code is to execute. Authors of malware often find that obtaining introductions to users and causing malicious code to execute on their respective machines is a much greater challenge than the actual construction of the malicious code. An exemplary approach distributors of malware have employed is social engineering, which is the process of using false pretenses to lure a user into installing malicious code on a machine of the user. In this approach, the introduction to the user is often obtained through spam.

Another exemplary approach to cause malicious code to execute on a computing device of a user is the exploitation of unpatched vulnerabilities in an application resident on a computing device. A drive-by download is one particular example of this approach, where the application with unpatched vulnerabilities that are desirably exploited is a web browser. For instance, a vulnerability of a web browser can allow malicious code to execute on the machine of a user without knowledge or consent of the user (e.g., without the user confirming that the malicious code is to be downloaded). In this approach, when a user causes a vulnerable browser (one with unpatched vulnerabilities) to visit a malicious web page, a computing device upon which the browser is executing is infected with malicious code. For example, an author of malware can set up a web site that hosts malicious content, waiting for users with vulnerable browsers to visit the web site. It can be ascertained that a number of computing devices that can be infected is directly related to the amount of traffic of web site(s) set up by the malware author.

A more common approach undertaken by malicious attackers is to infect an unknowing (innocent) web site with code that directs a browser, when loading a web page from the web site, to load malware from some other site (e.g., through a series of redirects). From the perspective of the attacker, a particularly attractive aspect of this approach is that traffic of the innocent site can be piggybacked. Thus, the introduction of the attacker to the user is provided by web traffic that a site is already attracting. Typically, rather than defacing performance of the innocent site, the attacker generally injects a malicious script that is employed to (eventually) redirect the vulnerable browser of the user to a server hosting a malicious payload. Accordingly, a computing device of the user that possesses the targeted vulnerabilities will become infected with the malicious payload. The initial web page loaded by the browser is referred to as the landing page, and the site with the malicious payload is called the exploit server.

Oftentimes, the path from the landing page to the exploit server will include numerous redirects. In an example, if the attacker succeeds in infecting the web server at foo.com, the attacker can direct all traffic to load the malicious content from bar.com. This can be done indirectly, such that a page at foo.com points to a.com, which points to b.com, which points to c.com, and so on, until the traffic reaches bar.com. Many times there will be many landing pages that share a small collection of exploit servers. The landing pages may also share some nodes in their redirection paths to the exploit servers. The collection of landing pages, exploit servers, and redirect servers is known as a malware distribution network (MDN).

Providers of web browsers generally attempt to quickly identify and patch vulnerabilities. Oftentimes, however, end users are not quick to update browsers on computing devices of the end users with appropriate patches. Search engines also attempt to identify web pages associated with malicious content, such that users of a respective search engine do not have their machines become infected, and subsequently quit using the search engine. The architecture of an MDN, however, makes the task of identifying infected landing pages, redirect servers, and exploit servers very difficult. This is at least partially because static crawlers, used by search engines to build their respective indexes, retrieve contents of web pages and do not execute any scripts that are coded into the web pages. The failure to execute scripts is due to the incredibly large number of web pages that search engines attempt to index; on the order of billions of web pages per day. Therefore, malicious actions performed by scripts on a landing page are largely invisible to static crawlers employed by search engines.

SUMMARY

The following is a brief summary of subject matter that is described in greater detail herein. This summary is not intended to be limiting as to the scope of the claims.

Described herein are various technologies pertaining to identifying web pages that belong to a malware distribution network (MDN). An MDN comprises an exploit server that includes malicious computer-executable code that is desirably installed and executed on a computing device of an end user. The computing device may be a conventional desktop computing device, a laptop computing device, an ultrabook, a tablet computing device (sometimes referred to as a slate computing device), a portable telephone, a dedicated reading device, a portable media player, or some other suitable computing device. In an exemplary embodiment, an attacker obtains access to the computing device of the user by way of a computer-executable application with unpatched vulnerabilities. In an exemplary embodiment, such application can be a web browser, although the claims are not so limited. For instance, in other embodiments, the application may be a computer-executable application that retrieves and aggregates web content for presentment to the user. The MDN also includes at least one redirect server that re-directs the application that accesses the landing page to the exploit server.

A web page can be identified as a landing page that belongs to the MDN based upon content from the web page extracted therefrom by a static crawler. The static crawler, in an exemplary embodiment, extracts content from web pages but fails to execute scripts therein. For example, search engines typically use static crawlers in connection with building their respective search engine indexes.

In a pre-processing step, a dynamic crawler can be executed over a relatively small number of web pages (compared to the number of web pages over which the static crawler is executed). The dynamic crawler can analyze content of web pages, follow links in web pages, as well as execute scripts in web pages. Since the dynamic crawler executes scripts and follows all links, output of the dynamic crawler can be employed to identify at least one landing page, redirect server, and exploit server of a particular MDN. For instance, traces output by the dynamic crawler can be analyzed, and traces identified as corresponding to a malicious attack that lead to a common exploit server can be labeled as being included in a particular MDN.

Subsequent to the output of the dynamic crawler identifying landing pages, redirect server(s), and exploit server(s), content of the landing pages as extracted by the static crawler can be retrieved (e.g., from a cache of a search engine or from the static crawler directly). Based upon such content, features (e.g., strings or clusters of strings) that are common across the landing pages can be identified. Subsequently, web pages belonging to other MDNs or innocent web pages can be analyzed together with the identified landing pages to ascertain which of the features of the landing pages belonging to the particular MDN are most reflective of the MDN. The result of such analysis can be a set of features extractable by the static crawler that, if existent in a web page, are highly indicative of the web page being a landing page of the MDN.

Thus, once the aforementioned set of features have been learned, content extracted from a web page by the static crawler can be analyzed to ascertain if such content includes the learned set of features. In an exemplary embodiment, a rules-based approach can be employed, wherein if the web page includes a threshold number or percentage of features in the set of features, the web page can be labeled as belonging to the MDN (e.g., a landing page of the MDN). In another exemplary embodiment, the learned set of features (together with other learned sets of features for other MDNs) can be employed to train a classifier that is configured to label web page as belonging to one of a plurality of potential MDNs or benign based upon content of the web page extracted by the static crawler. In either approach, after the web page has been labeled as belonging to the MDN, the web page can be provided to the dynamic crawler, which can execute over the web page to confirm that the web page is a landing page for the MDN. If it is found that the web page belongs to the MDN, the web page can be removed from subsequent search engine results pages and/or removed entirely from a search engine index.

Other aspects will be appreciated upon reading and understanding the attached figures and description.

BRIEF DESCRIPTION OF THE DRAWINGS

FIG. 3 is a table that illustrates exemplary output of a dynamic crawler.

FIG. 5 is a table that illustrates exemplary features that, if existent in content of a web page extracted by a static crawler, indicate that the web page is a landing page of a particular MDN.

DETAILED DESCRIPTION

Figure 1:
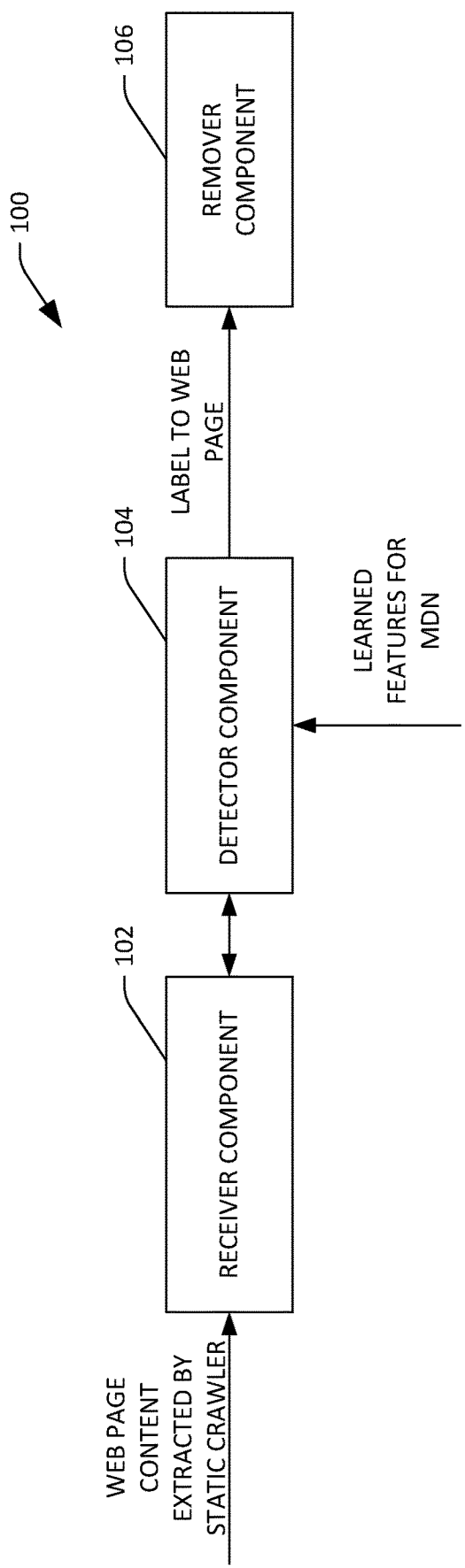
FIG. 1 is a functional block diagram of an exemplary system that facilitates identifying a web page as being a landing page of a malware distribution network (MDN).

Various technologies pertaining to identifying web pages as being landing pages of malware distribution networks (MDNs) based upon content extracted from such web pages by a static crawler will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates assigning a label to a web page that indicates that the web page is a landing page in a particular malware distribution network (MDN) is illustrated. As the term is used herein, a MDN is a collection of landing pages, exploit servers, and redirect servers that are collectively configured to infect end-user computing devices with malicious code. The term malware server, as used herein, is intended to encompass an exploit server and/or a redirect server. Generally, an attacker (an individual or script associated with the MDN) will inject malicious code into a web page, wherein the web page may be designed by the attacker or may be an innocent web page that is resident upon a computing device with a security vulnerability. To avoid detection, typically the malicious code injected in the web page is not a malicious payload, but is rather a pointer to another site or computing device, which may include a pointer to yet another site or computing device, etc., which eventually directs a web browser that loads the web page to the malicious payload. The malicious payload is then installed on the computing device of the user by way of a vulnerability in the web browser.

The system 100 is configured to utilize content extracted from web pages by a static crawler to determine whether respective web pages are landing pages of the particular MDN. Generally, with respect to MDNs, multi-hop redirection often exists in more sophisticated drive-by download attacks, where redirect servers utilized in the process of installing malicious code on a computing device of an end-user examine various conditions (e.g., browser type, version, plug-ins, etc.) to determine to which exploit server the web browser should be directed. For instance, a first redirection path may be followed by users who employ a first type of web browser, while a second redirection path may be taken by users who employ a second type of web browser. When the user causes the web browser to load the web page, the web page will trigger the first hop of redirection. As noted above, for compromised web pages, redirection is often caused by maliciously injected content.

The system 100 is configured to analyze content extracted from web pages by a static crawler to determine whether the respective web pages belong to the particular MDN. Static crawlers are computer-executable programs utilized by search engines to retrieve content, wherein such content is employed in connection with generating and maintaining respective search engine indexes. Generally, a static crawler executes continuously, visiting new web pages as such web pages are located (e.g. by traversing links) and revisiting known existing pages on a schedule that can be determined by the changefulness and rank of the web pages. In operation, the static crawler retrieves content of a web page for analysis, where some (but oftentimes not all) links identified in the content are added to the list of web pages to be subsequently crawled. The static crawler fails to fetch embedded images, execute any scripts in a web page, or otherwise attempt to render the web page as would be undertaken if the wage were loaded by a web browser.

The system 100 comprises a receiver component 102 that receives content of a web page extracted by the static crawler. In an exemplary embodiment, the receiver component 102 can receive the content of the web page extracted by the static crawler from a search engine cache. In another exemplary embodiment, the receiver component 102 can receive the content immediately subsequent to the static crawler extracting the content from the web page.

The system 100 further comprises a detector component 104 that receives the content of the web page extracted by the static crawler and outputs an indication that the web page belongs to the particular MDN based at least in part upon features in the content of the web page extracted by the static crawler and a set of features learned to correspond to the particular MDN in a pre-processing stage, which will be described below. Briefly, the set of features learned to correspond to the particular MDN is learned through analysis of output of a dynamic crawler over web pages that are landing pages in the MDN. Generally, a dynamic crawler examines web pages more thoroughly when compared to examination of web pages undertaken by the static crawler. Dynamic crawlers typically visit web pages posing as a vulnerable browser, and execute computer-executable instructions, such as scripts, that are resident on the web pages. If a computer-executable instruction involves fetching other links, the other links are followed by the dynamic crawler. Furthermore, dynamic crawlers can be configured to use different vulnerable browsers and operating systems components to trigger potential malicious reactions. If, when analyzing a web page, the dynamic crawler detects an attempt to exploit a known vulnerability of the web browser being mimicked by the dynamic crawler, the web page will be flagged as being potentially malicious.

In an exemplary embodiment, the detector component 104 can be configured with a regular expression that is employed in connection with searching for features in web page content extracted by the static crawler that have been learned to correspond to a particular MDN. The regular expression can be a portion of computer-executable code that executes relatively rapidly when ascertaining if a web page is a landing page of the particular MDN. In another exemplary embodiment, the detector component 104 can comprise a classifier that is configured to classify a web page as being a landing page of one of multiple MDNs, or alternatively, an innocent page. In either approach, the detector component 104 determines that the web page is a landing page of the MDN based upon features learned to be indicative of landing pages of the particular MDN that can be extracted from web pages by the static crawler.

The system 100 may optionally include a remover component 106 that, for instance, can remove a web page labeled as being a landing page in the MDN by the detector component 104 from a search engine results page (SERP). In an exemplary embodiment, the remover component 106 can be utilized to review search results retrieved by the search engine prior to the search results being provided to the user, and can remove web pages labeled as being landing pages in MDNs from such results. In another exemplary embodiment, the remover component 106 may be configured to remove landing pages identified by the detector component 104 from the search engine index, such that the search engine is unable to include such landing pages in search results.

In an exemplary embodiment, the system 100 may be comprised by the static crawler or execute concurrently with the static crawler, such that landing pages of MDNs can be identified as the static crawler is extracting content from such landing pages.

While system 100 has been described in connection with web pages and web browsers, it is to be understood that the technologies described herein are not limited to web pages and web browsers. In an exemplary embodiment, the system 100 can be configured to analyze advertisements that are injected into web pages. For example, an attacker may insert malicious code into an advertisement that is loaded by a web browser subsequent to an advertisement network injecting the advertisement into the web page. The malicious content in the advertisement may cause the web browser to receive a malicious payload in the manner described above (e.g., the malicious code in the advertisement directs the browser to an exploit server by way of some redirect path), and cause the malicious payload to be installed on the computing device of a user. In such case, the system 100 may be employable by an advertisement network that wishes to protect end-users from a malicious attacker.

In another exemplary embodiment, the system 100 can be employed to prevent an application that retrieves content from the web from installing malicious code on a computing device of a user of such application. For instance, applications have been configured for installment on portable telephones, tablet computing devices, and personal computing devices that retrieve web content, such as applications configured to retrieve and display weather conditions, financial information, news applications, etc. The system 100 may be installed on the computing device of a user and updated with the features learned to correspond to the MDN. As the application executes on the computing device of the user, the system 100 can be configured to extract content that is retrieved by such application to ensure that the application is not being employed as a portal to the computing device of the user for installation of a malicious payload. In such an embodiment, the system 100 can prevent the application from loading the malicious content. Still further, the system 100 may be a portion of an anti-virus package that can be installed on the computing device of the user, wherein the anti-virus package receives the above-described learned features.

Figure 2:
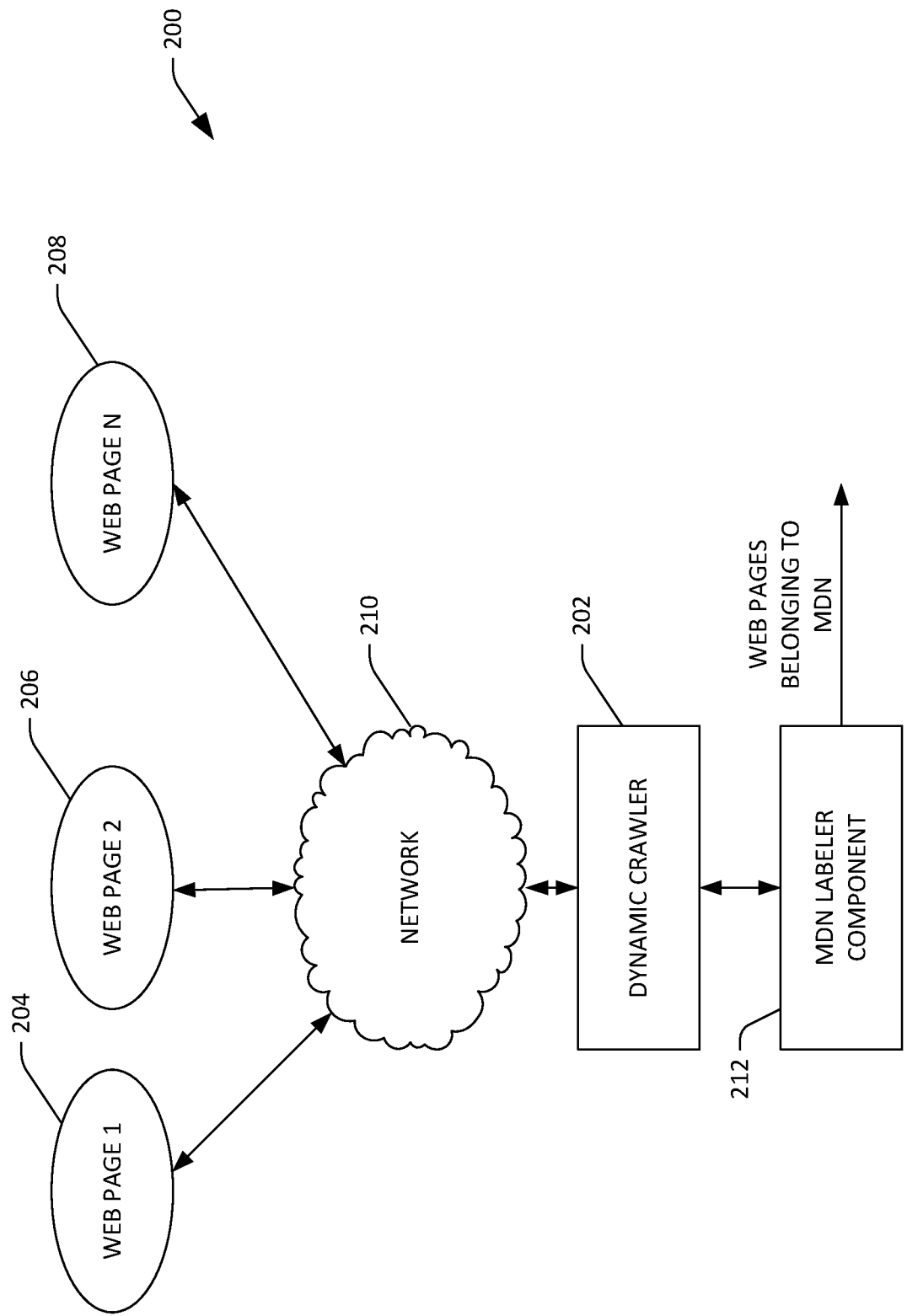
FIG. 2 is a functional block diagram of an exemplary system that facilitates analyzing output of a dynamic crawler to identify landing pages, redirect servers, and exploit servers belonging to MDNs.

Now referring to FIG. 2, an exemplary system 200 that facilitates employing a dynamic crawler to identify MDNs is illustrated. The system 200 comprises a dynamic crawler 202 that can crawl a plurality of web pages 204-208. The dynamic crawler 202 accesses the web pages 204-208 over a network 210, such as the Internet. As noted above, the dynamic crawler 202 can visit the web pages 204-208 posing as a vulnerable browser, and can execute scripts in the web pages 204-208. The dynamic crawler 202, since it is relatively slow (particularly compared to a static crawler), may only crawl a relatively small subset of web pages available on the network 210. The dynamic crawler 202 is configured to output a trace for each of the webpages 204-208 crawled by the dynamic crawler 202.

Referring briefly to FIG. 3, an exemplary output trace 300 of the dynamic crawler 202 is illustrated, wherein the output trace 300 is for a web page found to be a landing page of a particular MDN. As can be ascertained by reviewing the output 300, the dynamic crawler 202 was redirected to multiple different sites until reaching an exploit server (www.evil.com), where a malicious payload (malware.exe) was identified by the dynamic crawler 202.

Returning to FIG. 2, the system 200 further comprises an MDN labeler component 212 that receives outputs of the dynamic crawler 202 for the respective web pages 204-208, and, for each web page, ascertains whether a respective web page is a landing page of a MDN. Additionally, the MDN labeler component 212 can receive a set of labeled "innocent", or benign, web pages, which can be employed to assist in differentiating between MDN landing pages and benign pages. For example, the output of the dynamic crawler 202 for the web page 204 can indicate that the web page 204 directed the dynamic crawler 202 to a certain exploit server. The MDN labeler component 212 can, in an exemplary embodiment, label a group of web pages as belonging to a particular MDN if each of such web pages (through a variety of redirect servers) eventually directs the dynamic crawler 202 to a particular exploit server. It is to be understood that MDNs, however, may have complex structures and can comprise numerous landing pages, redirect servers, and exploit servers. In order to prevent relatively easy blacklisting, MDNs often use fast flux techniques, whereby an MDN can cause IP addresses and host names to alter frequently. Accordingly, the MDN labeler component 212 can develop a host-IP cluster (HIC) to identify related exploit servers and redirect servers of an MDN in the output of the dynamic crawler 202 for the web pages 204-208. In view of the above, it is to be understood that the MDN labeler component 212 can output the following data, for each analyzed web page belonging to an MDN: an identity of the web page, the identity of the MDN to which the web page belongs, and a label that indicates that the web page is a landing page in the identified MDN. Therefore, the MDN labeler component 212 will output groups of web pages that belong to multiple different MDNs.

Figure 4:
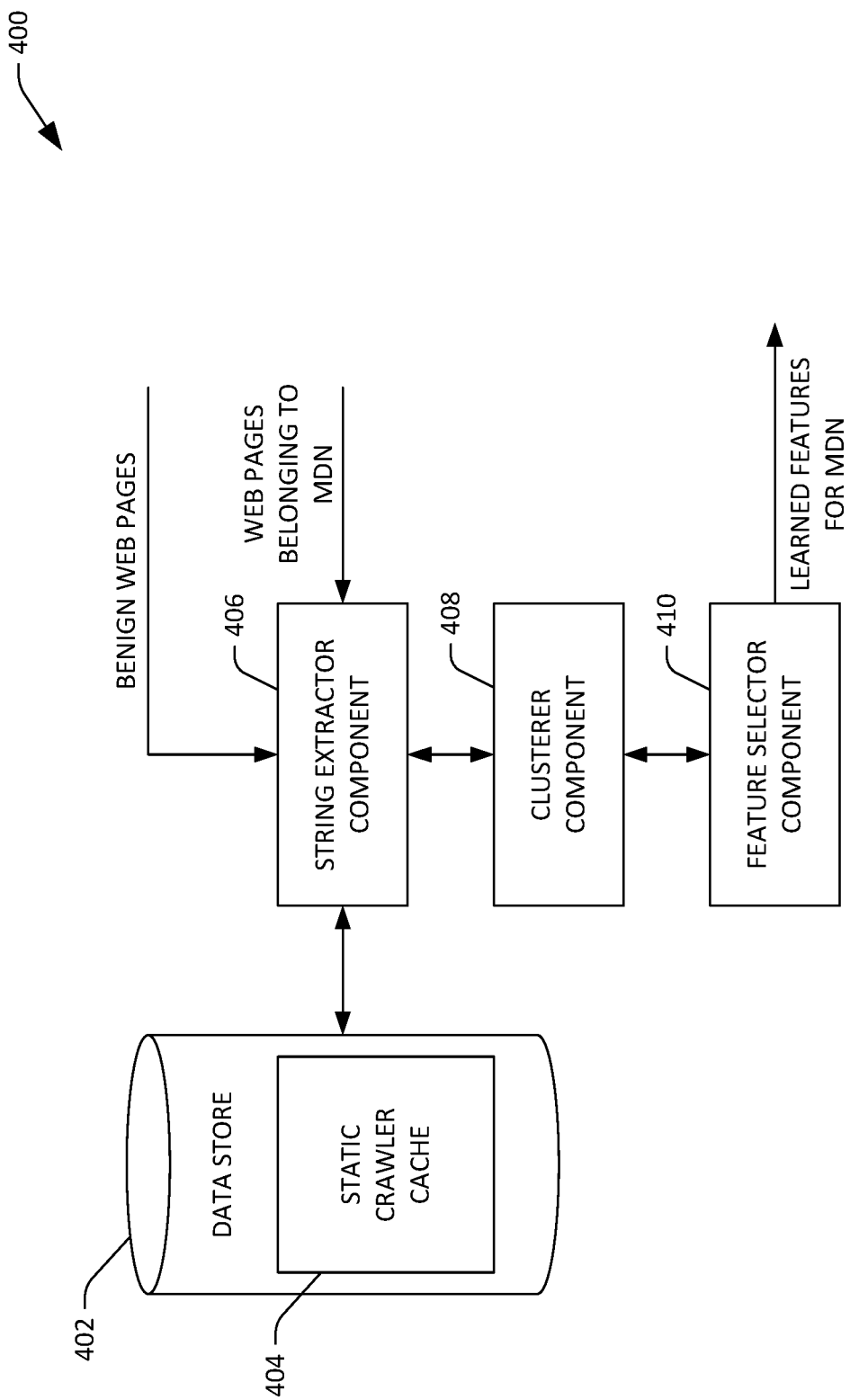
FIG. 4 is a functional block diagram of an exemplary system that facilitates learning features that, if existent in content of a web page extracted by a static crawler, indicate that the web page is a landing page of a particular MDN.

With reference now to FIG. 4, an exemplary system 400 that facilitates learning a set of features that can be extracted by the static web crawler from web pages is illustrated, wherein the set of features, if included in a web page, is indicative of the web page being a landing page in a particular MDN. The system 400 includes a data store 402, which may include a static crawler cache 404. The static crawler cache 404 can include content extracted from a plurality of web pages by a static crawler.

The system 400 further comprises a string extractor component 406 that receives data output by the MDN labeler component 212; namely, identities of the web pages belonging to the MDN as well as identities of the labeled benign pages. The string extractor component 406 may then extract strings from the static crawler cache 404 found in such web pages (both the identified landing pages and the benign web pages). In an exemplary embodiment, the string extractor component 406 can extract strings from content of the web pages in the static crawler cache 404 that potentially cause malicious redirection, such as the HTML elements, <script>, <iframe>, <form>, <frame>, <object>, <embed>, and the like. The string extractor component 406, therefore, can extract numerous strings per page, many of which will be non-malicious (innocent). Further, in an exemplary embodiment, the string extractor component 406 can extract strings from all content of a web page, including content in advertisements included in an iframe, for instance, of the web page. Initially, each extracted string can be considered as a potential feature that is indicative of a web page belonging to the MDN. The result of the string extraction from the static crawler cache 404 is a feature space that includes many times more features (e.g. strings) than landing pages from which the strings were extracted. Furthermore, the string extractor component 406 can cause a binary vector to be generated for each landing page, wherein the vector is indexed by the HIC of the MDN, and wherein the vector, for each extracted string, indicates whether the landing page includes a respective string. Such vector is relatively sparse (e.g., most strings appear on only a small number of the landing pages of the MDN identified by the MDN labeler component 212).

The system 400 may also optionally comprise a clusterer component 408 that can cluster strings extracted from the static crawler cache 404 based upon similarity therebetween. Clustering of strings may be desirably employed, as using strings alone as features to determine that a web page is a landing page in a particular MDN may be suboptimal. For instance, in certain MDNs, malicious content can vary slightly from landing page to landing page. Accordingly, although injected content may be similar, using exact matching may be ineffective in connection with identifying features that are indicative of a web page belonging to the MDN when such features are individual strings.

The clusterer component 408 can cluster strings of the landing pages of the MDN extracted by the string extractor component 406 from the static crawler cache 404 based upon similarity therebetween. For instance, even though an MDN may use polymorphism, causing polymorphic content to be in different forms, the main body of the code and code logic remain the same. The clusterer component 408, for each string, can transform the respective string into a set of trigrams. The clusterer component 408 can then define the Jaccard distance between two strings as follows:

$$D_{12} = 1 - \frac{\text{Intersection}(Set_1, Set_2)}{\text{Union}(Set_1, Set_2)}, \tag{1}$$

where $Set_k$ is the set of trigrams generated from the kth string. Accordingly, if a first string includes trigrams a, b, c, and d, and a second string includes b, d, e, g, and g, the distance between such strings would be $1 \times 2/7 \approx 0.71$. Using this Jaccard distance measure, minor polymorphic variations are found to be relatively close to one another. The clusterer component 408 can cluster strings into groups using such measure, wherein the clusterer component 408 may utilize any suitable clustering algorithm. In an exemplary embodiment, the clustering algorithm employed by the clusterer component 408 can refrain from requiring a preselected number of clusters or set a limit on a number of strings that are to be included in a cluster. Employing the clusterer component 408 as described above can reduce a total number of candidate features from a very large number of strings to a much smaller number of string clusters.

Turning briefly to FIG. 5, exemplary features 500 extracted from landing pages of an MDN is illustrated. Specifically, the exemplary features 500 include three features, wherein each feature in the three features comprises multiple similar, but non-identical strings. For example, the feature with ID number 642 comprises three strings, which are similar, but non-identical. The three strings can be clustered into the feature by the clusterer component 408.

Returning to FIG. 4, the system 400 further comprises a feature selector component 410 that selects features (strings) output by the string extractor component 406 or features (string clusters) output by the clusterer component 408 as features that are indicative of a web page being a landing page in a particular MDN. The features selected by the feature selector component 410 are ideally highly representative of features of landing pages of the particular MDN, but not indicative of non-malicious web pages or landing pages of other MDNs. Typically, in MDNs, landing pages have little in common other than their membership in the same MDN. Accordingly, strings that are common or even similar between landing pages of an MDN are good candidates to have been written by an author corresponding to the MDN rather than authors of the landing pages. In other words, strings that appear on landing pages of one MDN, but seldom (or never) on landing pages of other MDNs (or in innocent pages) are good features to characterize the particular MDN.

The feature selector component 410 is tasked with selecting such "good" features. In an exemplary embodiment, the feature selector component 410 can employ a feature selection algorithm based upon the mutual information between the ith MDN and the kth feature. Thus, the feature selector component 410 can receive the features from the string extractor component 406 for the landing pages of the MDN as well as features for landing pages of other MDNs and/or features of innocent web pages. Pursuant to an example, A (resp. C) can be defined as the number of landing pages not in the ith MDN that contain (resp. do not contain) the kth feature. B (resp. D), can be defined as the number of landing pages in the ith MDN that do not contain (resp. do contain) the kth feature. A maximum likelihood estimate of the information provided about membership in the ith MDN by the kth feature is, therefore, as follows:

$$R(f) = \frac{D}{N}\log_2 \frac{N \cdot D}{(\bar{B}D)(\bar{C}D)} + \frac{B}{N}\log_2 \frac{N \cdot B}{(\bar{A}B)(\bar{B}D)} + \frac{C}{N}\log_2 \frac{N \cdot C}{(\bar{C}D)(\bar{A}C)} + \frac{A}{N}\log_2 \frac{N \cdot A}{(\bar{A}B)(\bar{A}C)} \quad (2)$$

where
$\bar{A}B = (A + B)$, $\bar{A}C = (A + C)$, $\bar{B}D = (B + D)$, $\bar{C}D = (C + D)$, and
$N = A + B + C + D$.

A set of potential features can be ranked by the feature selector component 410 for each MDN according to the maximum likelihood estimate score set forth above, and some top threshold number of features (e.g., 5) can be selected for a particular MDN which best discriminate between features belonging to the particular MDN and all other MDNs and benign webpages under consideration. Such a technique employed by the feature selector component 410 effectively selects malicious code but also excludes benign injected code, such as normal third-party tracking code. As normal web tracking code frequently appears in benign web pages, their ranking scores would be lowered in the feature selection process.

While the features selected by way of the system 400 have been described above as being employed in connection with a static crawler to determine whether a web page is a landing page in an MDN, it is to be understood that such features can be employed in other applications. For instance, these features can be employed as a signature or portion of a signature in an antivirus application.

Returning to FIG. 1, in an exemplary embodiment, the detector component 104 can utilize this top threshold number of features to detect landing pages of the particular MDN based upon content extracted by the static crawler. Pursuant to an example, the receiver component 102 can receive content extracted by the static crawler for a certain web page, and the detector component 104 can compare the top threshold number of features, identified as described above, with the content of the web page extracted by the static crawler. If the content of the web page includes some threshold number of the features or percentage of the features, then the detector component 104 can label the web page as being a landing page of the MDN. Using such a rules-based approach can be undertaken relatively rapidly, such that web pages can be analyzed as the static crawler extracts content therefrom. In other embodiments, the detector component 104 can analyze contents of a static crawler cache periodically (e.g., once a day). Further, for example, the detector component 104 can include a computer-executable algorithm that comprises one or more regular expressions that are configured to quickly locate identified features.

In another exemplary embodiment, the detector component 104 can comprise a classifier that is learned based upon the features output by the feature selector component 410. When learning the classifier, numerous types of features can be analyzed, including the string clusters described above, individual strings in isolation, and regular expression features. Training of the classifier is undertaken through utilization of features identifies as belonging to MDNs as well as features belonging to benign web pages. Training of the classifier is discussed in greater detail below. Regular expressions can be generated utilizing an approach similar to that conventionally employed to capture spam URLs. With a set of strings as input, a regular expression can be generated that match the strings in the input set of strings. This may be able to capture more generic forms of links than the cluster string features.

After the MDN labeling and feature selection steps, labeled sparse binary data sets can be constructed for each of the three feature sets (string clusters, individual strings, regular expression features). An element in a data set is set to true if the web page associated with the row includes the feature associated with the column (e.g. includes the string, an element of the string cluster, or matches the regular expression). Separate classifiers can be trained for each feature set using multiclass logistic regression, neural networks, naïve Bayes, or any standard supervised classification algorithm. Each MDN is considered as one class, and all of the benign pages are considered as belonging to a single class. Once training is complete, the trained classifier of the detector component 104 can evaluate an unknown web page by calculating its feature vector and deciding to which class (e.g. particular MDN or benign set) it is most likely to belong.

Figure 6:
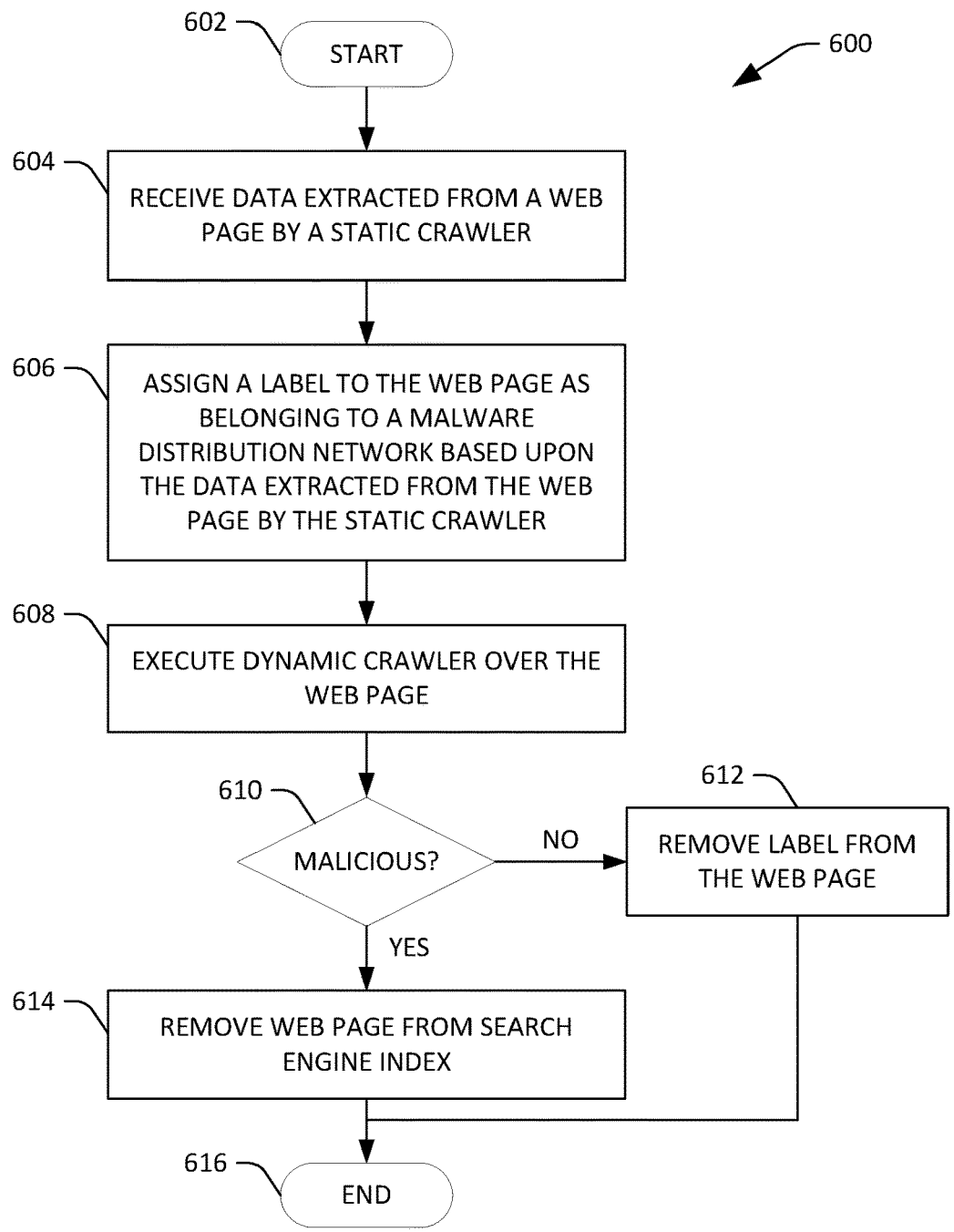
FIG. 6 is a flow diagram that illustrates an exemplary methodology for determining that a web page belongs to a MDN.
Figure 7:
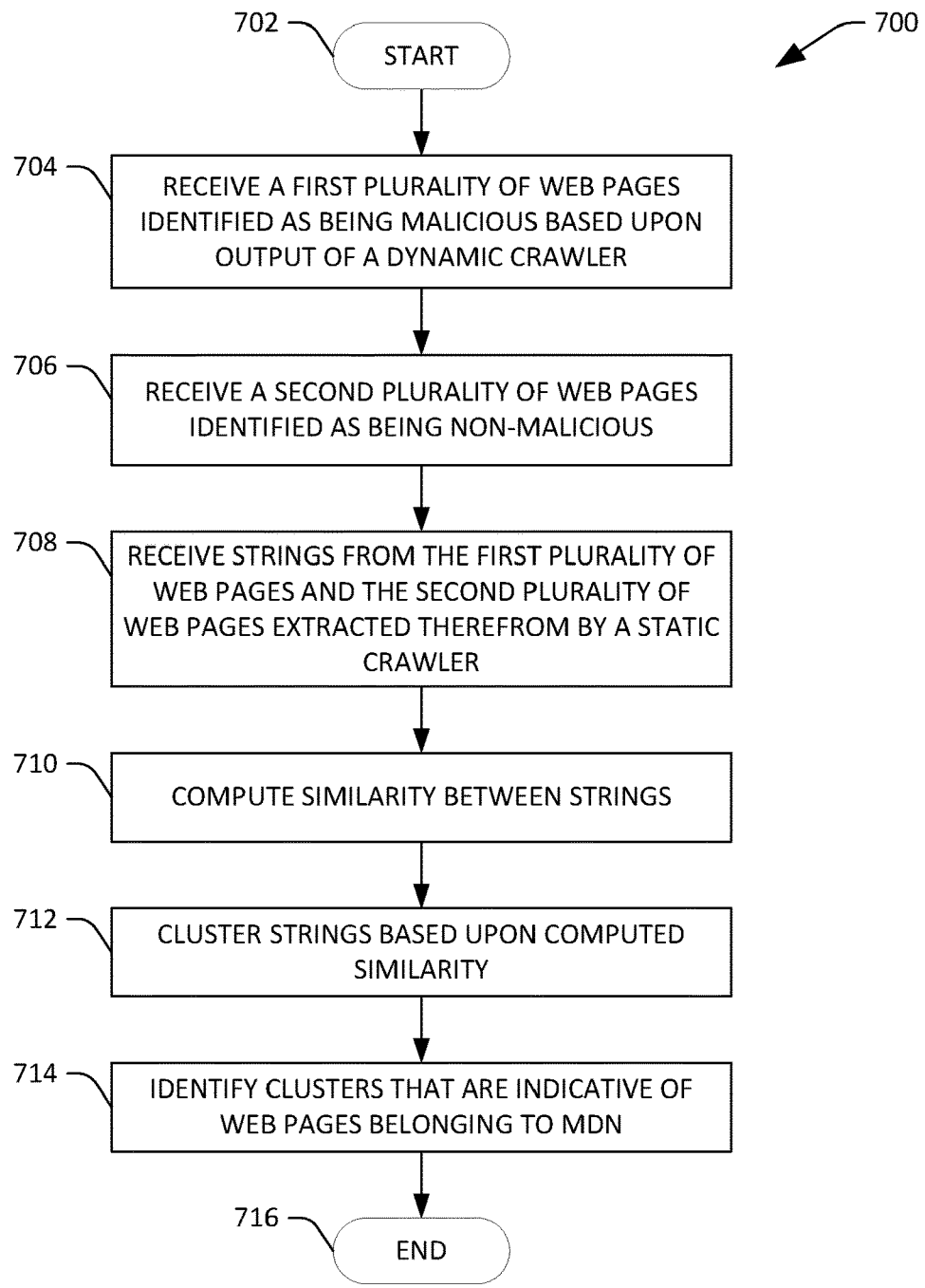
FIG. 7 is a flow diagram that illustrates an exemplary methodology for identifying features that correspond to web pages that belong to a MDN.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Turning now to FIG. 6, an exemplary methodology 600 that facilitates ascertaining that a web page is a landing page in an MDN is illustrated. The methodology 600 starts at 602, and at 604, data extracted from a web page by a static crawler is received. At 606, a label is assigned to the web page as belonging to a particular MDN based upon the data extracted from the web page by the static crawler. This label can be assigned through execution of a rule over the data extracted from the web page, where the rule is configured to search for certain features known to belong to the particular MDN. In another exemplary embodiment, a classifier can be executed over data extracted from the web page, and the classifier can indicate whether or not the web page belongs to an MDN. As noted above, assigning of the label can comprise comparing features (strings or sets of strings) in the data extracted from the web page by the static crawler with a set of features learned to correspond to the particular MDN. Such features can be learned based upon output of a dynamic crawler with respect to known landing pages of the MDN. Assigning the label to the web page also includes determining that the web page belongs to the MDN based at least in part upon the comparing. In other embodiments, rather than assigning the label through comparing features, the assigning of the label can be undertaken through utilization of a classifier that classifies the web page as belonging to the MDN from amongst a plurality of potential MDNs or innocent webpages.

As noted above, the acts 604 and 606 can be executed in the static crawler, such that the static crawler can automatically block web pages identified as being landing pages of an MDN from appearing on search engine results pages. In other embodiments, the acts 604 and 606 can be run periodically over output of a static crawler output (e.g. hourly, daily, etc.), and web pages can then be prevented from being included, for instance, in search engine results pages.

The methodology 600 may optionally include, at 608, executing the dynamic crawler over the web page subsequent to the assigning of the label to the web page as being a landing page of the MDN. This can be undertaken to confirm that the web page is a landing page of the MDN. Furthermore, the web page may belong to a certain domain name or hostname. Optionally, the dynamic crawler can be executed over other web pages that belong to the domain name or hostname, since such other web pages may be considered suspicious. In an exemplary embodiment, the dynamic crawler can be executed over each web page belonging to the domain name or hostname to which the web page labeled as being a landing page for the MDN belongs. At 610, a determination is made regarding whether, based upon the execution of the dynamic crawler over the web page, the web page, in fact, belongs to the MDN. If it is determined that the web page is not malicious (is not a landing page in the MDN), then optionally, at 612, the label assigned at 606 can be removed from the web page. If, however, the web page is found to be malicious at 610, then at 614, for instance, the web page can be removed from the search engine index, such that the search engine is unable to provide the web page in a search results page. Moreover, the web page can be added to the set of labeled web pages (labeled as belonging to the particular MDN) for future processing (e.g., for feature identification). In an exemplary embodiment, the acts 610, 612, and 614 can be undertaken for each web page belonging to the domain name or hostname to which the web page identified as the landing page of the MDN belongs. The methodology 600 complete to 616.

Now referring to FIG. 7, an exemplary methodology 700 that facilitates identifying features that are indicative of a web page belonging to a particular MDN is illustrated. The methodology 700 starts at 702, and 704, a first plurality of web pages identified as being malicious based upon output of a dynamic crawler is received. Such first plurality of web pages, for example, may belong to a particular MDN.

At 706, a second plurality of webpages is received that are identified as being non-malicious (innocent) or as belonging to another MDN.

At 708, strings from the first plurality of web pages and the second plurality of web pages are received, wherein such strings are extracted therefrom by a static crawler. At 710, similarity scores are computed between pairs of strings extracted at 708. At 712, strings are clustered based at least in part upon the similarity scores computed at 710, and at 714, clusters that are highly indicative of web pages belonging to the MDN are identified. It is to be understood that, while the methodology 700 describes string clusters as being features that are used to ascertain whether a web page is a landing page in an MDN, other features are contemplated. Such other features include exact match strings, regular expressions, amongst others. Such features can be employed in isolation or in any suitable combination in connection with identifying web pages that belong to an MDN. The methodology 700 completes the 716.

Figure 8:
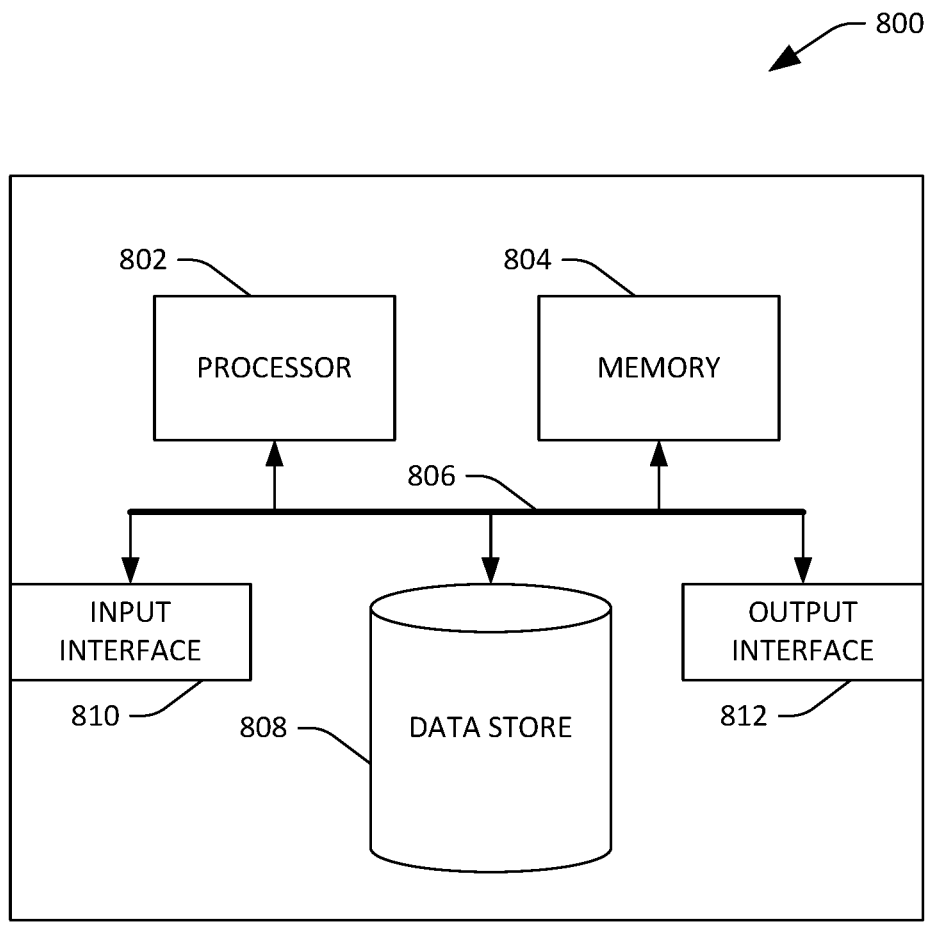
FIG. 8 is an exemplary computing device.

Now referring to FIG. 8, a high-level illustration of an exemplary computing device 800 that can be used in accordance with the systems and methodologies disclosed herein is illustrated. For instance, the computing device 800 may be used in a system that supports determining that a web page is a landing page of an MDN based upon content of the web page extracted therefrom by a static crawler. In another example, at least a portion of the computing device 800 may be used in a system that supports learning features that are indicative of membership in an MDN. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store strings, clusters, regular expressions, web page content, etc.

The computing device 800 additionally includes a data store 808 that is accessible by the processor 802 by way of the system bus 806. The data store 808 may be or include any suitable computer-readable storage, including a hard disk, memory, etc. The data store 808 may include executable instructions, web page content, a static crawler cache, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computing system that is configured to prevent a client computing device from being infected with malicious code, the computing system comprising:
   A hardware processor; and
   memory storing instructions that, when executed by the hardware processor, cause the hardware processor to perform acts comprising:
   receiving output of a static crawler with respect to a web page crawled by the static crawler, wherein the static crawler is not configured to execute any scripts and is further not configured to fetch any embedded images in the web page, wherein the output of the static crawler comprises a plurality of features for the web page, and further wherein the web page, if loaded by a web browser of the client computing device, will cause the client computing device to retrieve malicious code from a source other than the web page;
   based upon the features for the web page in the output of the static crawler, identifying that the web page will cause the client computing device to retrieve malicious code from the source other than the web page and is a landing page for a malware distribution network (MDN) from amongst a plurality of possible MDNs, wherein each MDN in the plurality of possible MDNs comprises a respective landing page, a respective redirect server, and a respective exploit server, wherein the respective redirect server is configured to redirect web browsers to the respective exploit server, and further wherein the respective exploit server is configured to direct respective malicious code to the web browsers; and
   subsequent to identifying that the web page is the landing page for the MDN, performing an action that is configured to prevent the web browser from loading the web page.

2. The computing system of claim 1, wherein the computing system executes a search engine, the acts further comprising:
   receiving, at the search engine, a query from the client computing device;
   identifying search results based upon the query, wherein the search results comprise the web page, wherein performing the action comprises removing the web page from the search results to form modified search results; and
   responsive to removing the web page from the search results, transmitting the modified search results to the client computing device.

3. The computing system of claim 2, wherein the web page is identified as being the landing page of the MDN subsequent to the search engine receiving the query.

4. The computing system of claim 1, wherein performing the action comprises removing reference to the web page from a search engine index used by a search engine to generate search results, such that the search engine is unable to return the web page as a search result in response to receipt of a query.

5. The computing system of claim 1, wherein the static crawler is further not configured to render the web page when generating the output.

6. The computing system of claim 1, wherein identifying that the web page is the landing page for the MDN from amongst the plurality of possible MDNs comprises:
   performing a comparison between the features in the output of the static crawler with a set of features learned to be indicative of the MDN, wherein the web page is identified as being the landing page for the MDN based upon the comparison.

7. The computing system of claim 1, wherein identifying that the web page is the landing page for the MDN from amongst the plurality of possible MDNs comprises:
   providing the features to a classifier, wherein the classifier has been trained to identify web pages that are landing pages of the MDN based upon a set of features learned to be indicative of the MDN.

8. The computing system of claim 1, the acts further comprising:
   subsequent to identifying that the web page is the landing page of the MDN and prior to performing the action, executing a dynamic crawler over the web page; and
   confirming that the web page is the landing page of the MDN based upon output of the dynamic crawler.

9. The computing system of claim 1, the acts further comprising:
   prior to receiving the output of the static crawler, identifying that a plurality of web pages are landing pages of the MDN based upon output of a dynamic crawler that crawled the plurality of web pages; and
   identifying a set of features that are indicative of the MDN based upon the dynamic crawler identifying that the plurality of web pages are landing pages of the MDN.

10. A computer-readable storage medium comprising instructions that, when executed by a processor, cause the processor to perform acts comprising:

receiving output of a static crawler, the output comprises features of a web page extracted from the web page when the web page was crawled by the static crawler, wherein the web page comprises code that causes browsers executing on client computing devices to retrieve malicious code from a source that is different from the web page when the browsers load the web page, and further wherein the static crawler is not configured to execute the code when crawling the web page;

performing a comparison between the features of the web page and each set of features in several sets of features, each set of features learned to be indicative of a respective malware distribution network (MDN) from amongst several MDNs;

based upon the comparison, labelling the web page as being a landing page of a MDN from amongst the several MDNs; and responsive to labelling the web page as being the landing page of the MDN, updating a search engine index to remove reference to the web page from the search engine index, such that a search engine that searches the search engine index to generate search results is unable to return the web page as a search result.

11. A method executed by a computing system, the method facilitating prevention of execution of malicious code at a client computing device, the method comprising:

receiving output of a static crawler with respect to a web page crawled by the static crawler, wherein the static crawler is not configured to execute any scripts and is further not configured to fetch any embedded images in the web page, wherein the output of the static crawler comprises a plurality of features for the web page, and further wherein the web page, if loaded by a web browser of the client computing device, will cause the client computing device to retrieve malicious code from a source other than the web page;

based upon the features for the web page in the output of the static crawler, identifying that the web page will cause the client computing device to retrieve malicious code from the source other than the web page and is a landing page for a malware distribution network (MDN) from amongst a plurality of possible MDNs, wherein each MDN in the plurality of possible MDNs comprises a respective landing page, a respective redirect server, and a respective exploit server, wherein the respective redirect server is configured to redirect web browsers to the respective exploit server, and further wherein the respective exploit server is configured to direct respective malicious code to the web browsers; and subsequent to identifying that the web page is the landing page for the MDN, performing an action that is configured to prevent the web browser from loading the web page.

12. The method of claim 11, wherein the computing system executes a search engine, the method further comprising:

receiving, at the search engine, a query from the client computing device;

identifying search results based upon the query, wherein the search results comprise the web page, wherein performing the action comprises removing the web page from the search results to form modified search results; and responsive to removing the web page from the search results, transmitting the modified search results to the client computing device.

13. The method of claim 12, wherein the web page is identified as being the landing page of the MDN subsequent to the search engine receiving the query.

14. The method of claim 11, wherein performing the action comprises removing reference to the web page from a search engine index used by a search engine to generate search results, such that the search engine is unable to return the web page as a search result in response to receipt of a query.

15. The method of claim 11, wherein the static crawler is further not configured to render the web page when generating the output.

16. The method of claim 11, wherein identifying that the web page is the landing page for the MDN from amongst the plurality of possible MDNs comprises:

performing a comparison between the features in the output of the static crawler with a set of features learned to be indicative of the MDN, wherein the web page is identified as being the landing page for the MDN based upon the comparison.

17. The method of claim 11, wherein identifying that the web page is the landing page for the MDN from amongst the plurality of possible MDNs comprises:

providing the features to a classifier, wherein the classifier has been trained to identify web pages that are landing pages of the MDN based upon a set of features learned to be indicative of the MDN.

18. The method of claim 11, further comprising:

subsequent to identifying that the web page is the landing page of the MDN and prior to performing the action, executing a dynamic crawler over the web page; and confirming that the web page is the landing page of the MDN based upon output of the dynamic crawler.

19. The method of claim 11, further comprising:

prior to receiving the output of the static crawler, identifying that a plurality of web pages are landing pages of the MDN based upon output of a dynamic crawler that crawled the plurality of web pages; and identifying a set of features that are indicative of the MDN based upon the dynamic crawler identifying that the plurality of web pages are landing pages of the MDN.

* * * * *